United States Patent
Wu et al.

(10) Patent No.: US 9,953,520 B2
(45) Date of Patent: Apr. 24, 2018

(54) LED LIGHTING DEVICE, AND SMART HOME CONTROL SYSTEM AND METHOD

(71) Applicant: SENGLED OPTOELECTRONICS CO., LTD., Tongxiang (CN)

(72) Inventors: Hui Wu, Tongxiang (CN); Chuang Chen, Tongxiang (CN); Hongwei Wu, Tongxiang (CN); Xingming Deng, Tongxiang (CN); JinXiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 93 days.

(21) Appl. No.: 14/888,967

(22) PCT Filed: Apr. 27, 2015

(86) PCT No.: PCT/CN2015/077494
§ 371 (c)(1),
(2) Date: Nov. 4, 2015

(87) PCT Pub. No.: WO2015/172631
PCT Pub. Date: Nov. 19, 2015

(65) Prior Publication Data
US 2016/0171880 A1 Jun. 16, 2016

(30) Foreign Application Priority Data
May 13, 2014 (CN) .......................... 2014 1 0203593

(51) Int. Cl.
*G08C 23/04* (2006.01)
*G05B 15/02* (2006.01)
(Continued)

(52) U.S. Cl.
CPC ............. *G08C 23/04* (2013.01); *G05B 15/02* (2013.01); *H04L 12/2816* (2013.01);
(Continued)

(58) Field of Classification Search
CPC ............ G05B 15/02; G05B 2219/2613; G05B 2219/23043; G05B 2219/2642; H04W 84/12; G08C 23/04; H04L 12/2816
See application file for complete search history.

(56) References Cited

U.S. PATENT DOCUMENTS

2006/0129848 A1* 6/2006 Paksoy ................... G06F 21/78
713/193
2011/0103617 A1* 5/2011 Shin ......................... H03G 3/32
381/107
(Continued)

FOREIGN PATENT DOCUMENTS

CN 202798812 U 3/2013
CN 103533706 A 1/2014
(Continued)

OTHER PUBLICATIONS

The World Intellectual Property Organization (WIPO) International Search Report for PCT/CN2015/077494 dated Jul. 22, 2015.

*Primary Examiner* — Shi K Li
*Assistant Examiner* — Mina Shalaby
(74) *Attorney, Agent, or Firm* — Anova Law Group, PLLC

(57) ABSTRACT

An LED lighting device, and a smart home control system and method are provided. A smart terminal is configured to send a control instruction to an LED lighting device and to receive at least one sound pulse signal from the LED lighting device to remotely control one or more household electrical appliances that have an infrared remote control function. The LED lighting device includes a Wi-Fi module, an infrared remote control module and a sound pulse detection module. The Wi-Fi module receives the control instruction and transmits the control instruction to the infrared remote control module. The infrared remote control module converts the control instruction to an infrared control signal. The
(Continued)

sound pulse detection module detects a prompt tone when the one or more household electrical appliances are turned on remotely, converts the prompt tone to a sound pulse signal, and sends the sound pulse signal to the smart terminal.

18 Claims, 5 Drawing Sheets

(51) Int. Cl.
*H04L 12/28* (2006.01)
*H04W 84/12* (2009.01)
(52) U.S. Cl.
CPC ....... *H04W 84/12* (2013.01); *G05B 2219/163* (2013.01); *G05B 2219/23043* (2013.01); *G05B 2219/2613* (2013.01); *G05B 2219/2642* (2013.01)

(56) References Cited

U.S. PATENT DOCUMENTS

| | | | |
|---|---|---|---|
| 2011/0117850 A1 | 5/2011 | Fung | |
| 2013/0107131 A1* | 5/2013 | Barnett | G08C 17/02 348/734 |
| 2015/0097961 A1* | 4/2015 | Ure | G08B 5/223 348/159 |
| 2015/0161835 A1* | 6/2015 | Jablokov | G07C 9/00111 340/5.61 |
| 2015/0351203 A1* | 12/2015 | Shen | G08C 17/02 315/294 |

FOREIGN PATENT DOCUMENTS

| | | |
|---|---|---|
| CN | 204044598 U | 12/2014 |
| KR | 20010044639 A | 6/2001 |

\* cited by examiner

LED LIGHTING DEVICE, AND SMART HOME CONTROL SYSTEM AND METHOD

CROSS-REFERENCES TO RELATED APPLICATIONS

This application is a national stage patent application of PCT application No. PCT/CN2015/077494, filed on Apr. 27, 2015. This PCT application claims priority to Chinese Patent Application No. 201410203593.1, filed on May 13, 2014, the entire content of which is incorporated herein by reference.

FIELD OF THE INVENTION

The present disclosure generally relates to the field of light emitting diode (LED) lighting technology and, more particularly, relates to an LED lighting device, and a smart home control system and method.

BACKGROUND

Wireless Fidelity (Wi-Fi) technology is a technology used to connect smart terminals (e.g., personal computers (PCs), smartphones, etc.) together wirelessly. LED lighting may generally provide advantages in energy conservation, environmental protection, controllable lighting, solid state lighting, and long operational lifetime. LED lamps thus have been widely used in various areas for public, commercial, and/or indoor lighting in a low carbon life. The specific power supply and control method of the LED lighting device make it very easy to integrate certain intelligent/smart control and multimedia functions.

Currently, in a smart home, there is a big demand for wireless and remote control of household electrical appliances. However, because some household electrical appliances, such as air conditioners, have a long service life and may not be upgraded or replaced in a short time. Because the traditional air conditioners only support an infrared remote control, a handheld remote controller is needed to emit a control signal. Also, the control signal has directivity, and the signal cannot go through a concrete wall. Therefore, the wireless remote control for the traditional household electrical appliances (e.g., air conditioners) becomes a more difficult problem. In addition, a universal remote control may not be used to remote control all household electrical appliances. A unified control for the household electrical appliances cannot be realized.

The disclosed LED lighting devices, and smart home control systems and methods are directed to solve one or more problems set forth above and other problems.

BRIEF SUMMARY OF THE DISCLOSURE

One aspect of the present disclosure includes a smart home control system. The system includes a light emitting diode (LED) lighting device and a smart terminal configured to send a control instruction to the LED lighting device and to receive at least one sound pulse signal from the LED lighting device. Further, the LED lighting device includes a Wireless Fidelity (Wi-Fi) module, an infrared remote control module, and a sound pulse detection module. The Wi-Fi module is configured to receive the control instruction sent from the smart terminal and transmit the control instruction to the infrared remote control module. The infrared remote control module is configured to convert the control instruction to an infrared control signal used to control one or more of a plurality of household electrical appliances that have an infrared remote control function. The sound pulse detection module is configured to detect a prompt tone when the one or more of the plurality of household electrical appliances are turned on remotely, convert the prompt tone to a sound pulse signal, and send the sound pulse signal to the smart terminal through the Wi-Fi module, such that the smart terminal determines whether the one or more of the plurality of household electrical appliances are turned on.

Another aspect of the present disclosure includes a smart home control method. The method includes receiving a control instruction sent from a smart terminal and converting the control instruction to an infrared control signal. The method also includes controlling one or more of a plurality of household electrical appliances using the infrared control signal and detecting a prompt tone when the one or more of the plurality of household electrical appliances are turned on remotely. Further, the method includes converting the prompt tone to a sound pulse signal and sending the sound pulse signal to the smart terminal, such that the smart terminal determines whether the one or more of the plurality of household electrical appliances are turned on.

Another aspect of the preset disclosure includes an LED lighting device. The LED lighting device includes a power supply module configured to provide power for the LED lighting device and a light emitting module configured to emit light. The LED lighting device also includes a Wi-Fi module configured to receive a control instruction sent from a smart terminal, send the received control instruction to an infrared remote control module and send a sound pulse signal corresponding to a prompt tone to the smart terminal. Further, the LED lighting device includes the infrared remote control module configured to convert the control instruction to an infrared control signal and a sound pulse detection module configured to detect the prompt tone when one or more of a plurality of household electrical appliances are turned on remotely, convert the prompt tone to a sound pulse signal and send the sound pulse signal to the Wi-Fi module.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
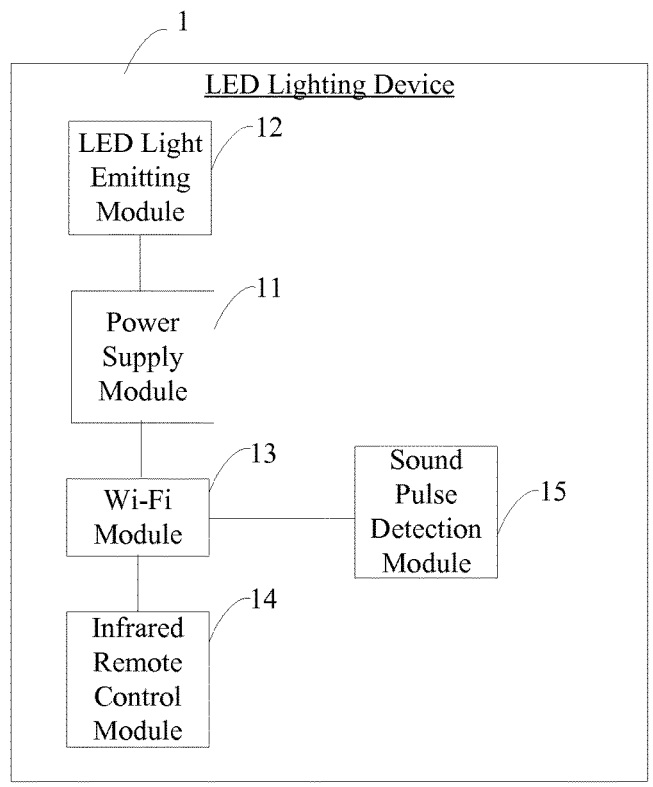
FIG. 1 illustrates a structure schematic diagram of an exemplary LED lighting device consistent with the disclosed embodiments.

FIG. 1 illustrates a structure schematic diagram of an exemplary LED lighting device consistent with the disclosed embodiments. As shown in FIG. 1, the LED lighting device 1 includes a power supply module 11, an LED light emitting module 12, a Wi-Fi module 13, an infrared remote control module 14, and a sound pulse detection module 15. The LED light emitting module 12 is connected to the power supply module 11, and the power supply module 11 is configured to provide power for the whole LED lighting device 1. Certain devices may be omitted and other devices may be included.

The Wi-Fi module 13 and the infrared remote control module 14 are electrically connected. The Wi-Fi module 13 is configured to send a control instruction received from a smart terminal to the infrared remote control module 14. The infrared remote control module 14 is configured to convert the control instruction into an infrared control signal. The infrared control signal is used to control one of a plurality of household electrical appliances (e.g., an air conditioner).

The sound pulse detection module 15 is configured to detect a prompt tone when one or more of the plurality of household electrical appliances are turned on remotely, to convert the prompt tone to a sound pulse signal and to send the sound signal to the Wi-Fi module 13. Then, the Wi-Fi module 13 sends the sound pulse signal to the smart terminal. The sound pulse detection module 15 may be installed at an outer surface of the LED lighting device 1.

A smart home control system is configured to control the household electrical appliances (e.g., household electrical appliance 1, household electrical appliance 2, . . . , household electrical appliance N) that have an infrared remote control function. For example, the household appliances may be air conditioners, dishwashers, clothes dryers, drying cabinets, freezers, refrigerators, kitchen stoves, water heaters, washing machines, microwave ovens, and induction cookers.

In one embodiment, the smart home control system includes an LED lighting device as shown in FIG. 1, a Wi-Fi router, a smart terminal, and/or other suitable devices. The smart terminal may be directly connected to the Wi-Fi module 13 of the LED lighting device 1. The smart terminal may also be connected to the Wi-Fi module 13 of the LED lighting device 1 through the Wi-Fi router. In addition, the smart terminal may also be directly connected to the Internet.

Figure 2:
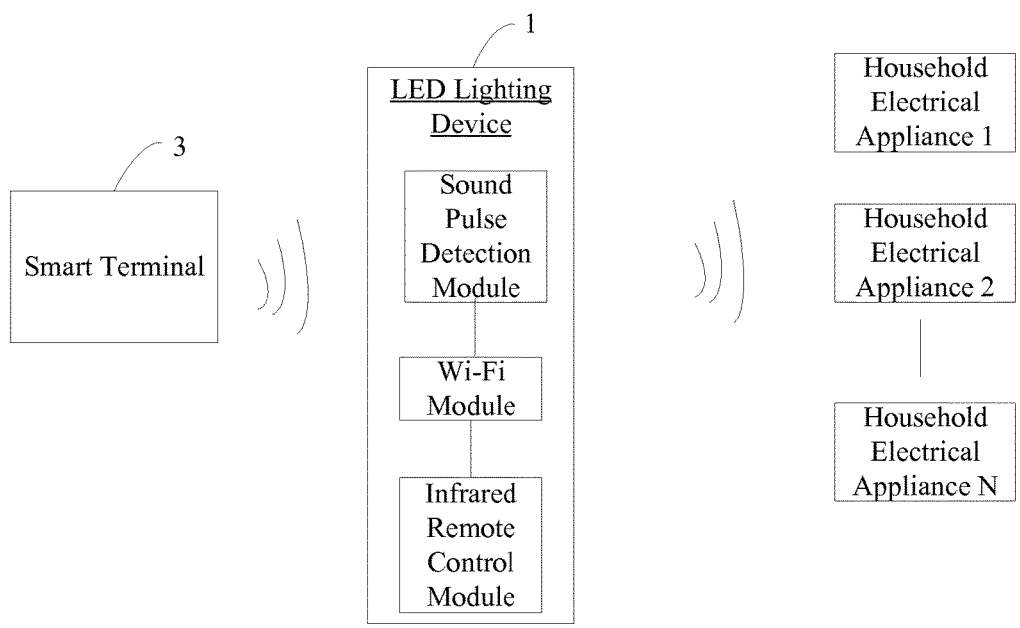
FIG. 2 illustrates a structure schematic diagram of an exemplary smart home control system consistent with the disclosed embodiments.

For example, FIG. 2 illustrates a structure schematic diagram of an exemplary smart home control system consistent with the disclosed embodiments. As shown in FIG. 2, the smart home control system includes an LED lighting device 1, a smart terminal 3, and a plurality of household electrical appliances (i.e., household electrical appliance 1, household electrical appliance 2 . . . household electrical appliance N).

If the Wi-Fi module 13 of the LED lighting device 1 has a Wi-Fi routing function, the smart terminal 3 may be directly connected to the LED lighting device 1 through the Wi-Fi module 13, without using a Wi-Fi router. In this case, the smart terminal 3 sends a control instruction to the infrared remote control module 14 through the Wi-Fi module 13. Then, the infrared remote control module 14 converts the control instruction to an infrared control signal. The converted infrared control signal can be used to control at least one of the household electrical appliance, e.g., from appliance 1 to appliance N.

Figure 3:
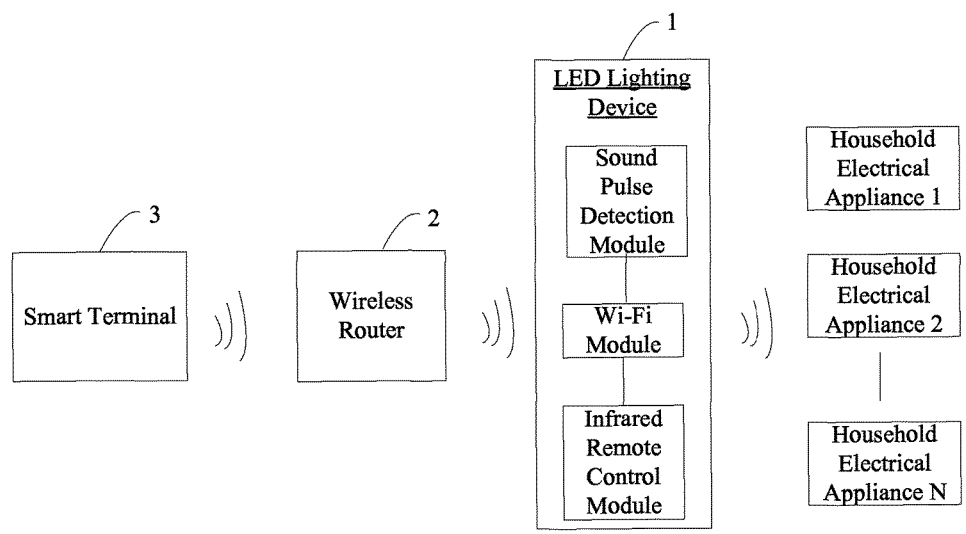
FIG. 3 illustrates a structure schematic diagram of another exemplary smart home control system consistent with the disclosed embodiments.

FIG. 3 illustrates a structure schematic diagram of another exemplary smart home control system consistent with the disclosed embodiments. As shown in FIG. 3, the smart home control system includes an LED lighting device 1, a Wi-Fi router 2, a smart terminal 3, and/or a plurality of household electrical appliances (i.e., household electrical appliance 1, household electrical appliance 2 . . . household electrical appliance N). The smart terminal 3 is connected to the Wi-Fi router 2. The LED lighting device 1 is connected to a wireless network provided by the Wi-Fi router 2 through the Wi-Fi module 13. At this point, the smart terminal 3 and the Wi-Fi module 13 are on a same network segment. The smart terminal 3 sends a control instruction to the Wi-Fi module 13 of the LED lighting device 1 through the Wi-Fi router 2. The Wi-Fi module 13 transmits the control instruction to the infrared remote control module 14. Then, the infrared remote control module 14 converts the control instruction to an infrared control signal. The converted infrared control signal can be used to control at least one of the household electrical appliance, e.g., from appliance 1 to appliance N.

Figure 4:
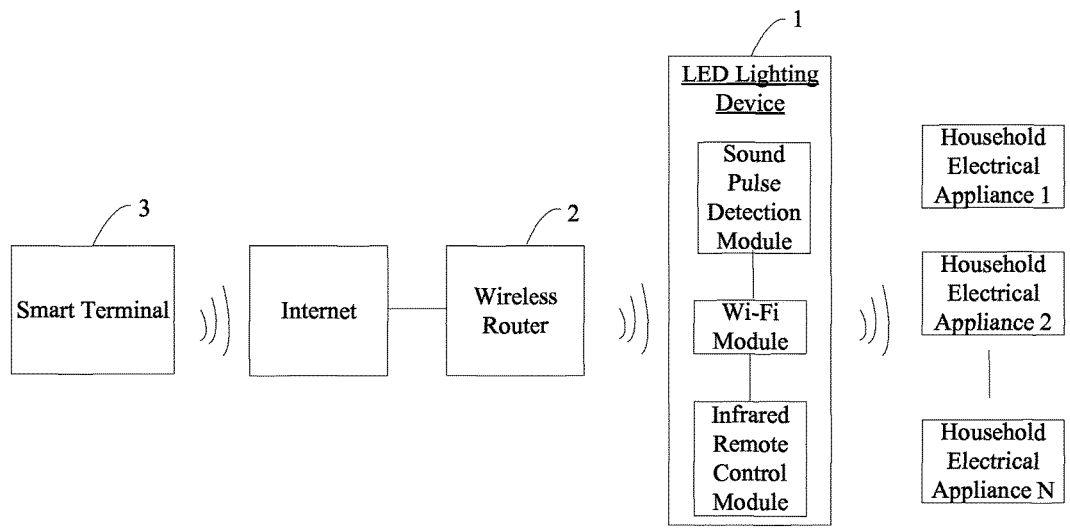
FIG. 4 illustrates a structure schematic diagram of another exemplary smart home control system consistent with the disclosed embodiments.

FIG. 4 illustrates a structure schematic diagram of another exemplary smart home control system consistent with the disclosed embodiments. As shown in FIG. 4, the smart home control system includes an LED lighting device 1, a Wi-Fi router 2, a smart terminal 3, and/or a plurality of household electrical appliances (i.e., household electrical appliance 1, household electrical appliance 2 . . . household electrical appliance N). The smart terminal 3 is connected to the Internet. The Wi-Fi router 2 is also connected to the Internet. After the LED lighting device 1 is wirelessly connected to the Wi-Fi router 2 through the Wi-Fi module 13, the LED lighting device 1 is connected to the Internet. At this point, the Wi-Fi router 2 is a route gateway. The smart terminal 3 sends a control instruction to the Wi-Fi router 2 through the Internet. The Wi-Fi router 2 sends the control instruction to the Wi-Fi module 13 of the LED lighting device 1. After the Wi-Fi module 13 receives the control instruction, the Wi-Fi module 13 transmits the control instruction to the infrared remote control module 14. Then, the infrared remote control module 14 converts the control instruction to an infrared control signal. The converted infrared control signal can be used to control at least one of the household electrical appliance, e.g., from appliance 1 to appliance N.

Figure 5:
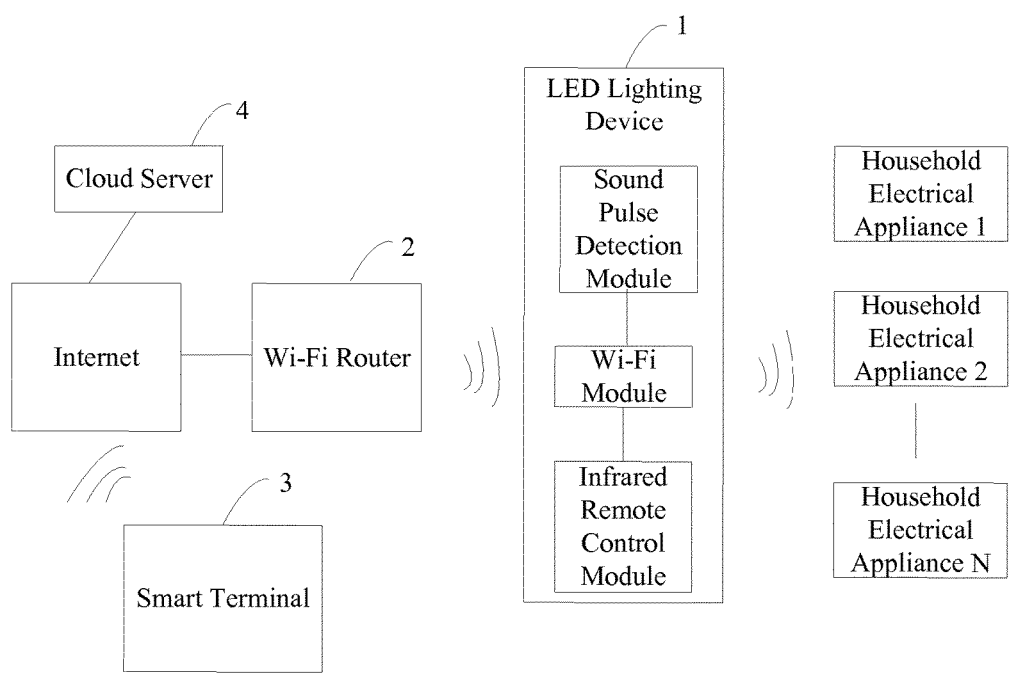
FIG. 5 illustrates a structure schematic diagram of another exemplary smart home control system consistent with the disclosed embodiments.

FIG. 5 illustrates a structure schematic diagram of another exemplary smart home control system consistent with the disclosed embodiments. As shown in FIG. 5, the smart home control system includes an LED lighting device 1, a Wi-Fi router 2, a smart terminal 3, a cloud server 4, and/or a plurality of household electrical appliances (i.e., household electrical appliance 1, household electrical appliance 2 . . . household electrical appliance N). The smart terminal 3 is connected to the cloud server 4 through the Internet. The Wi-Fi router 2 is connected to the cloud server 4 through the Internet. After the LED lighting device 1 is wirelessly connected to the Wi-Fi router 2 through the Wi-Fi module 13, the LED lighting device 1 is connected to the Internet.

The smart terminal 3 sends a control instruction to the cloud server 4 through the Internet. The cloud server 4 sends the control instruction to the Wi-Fi module 13 of the LED lighting device 1 through the Internet and the Wi-Fi router 2. After the Wi-Fi module 13 receives the control instruction, the Wi-Fi module 13 transmits the control instruction to the infrared remote control module 14. Then, the infrared remote control module 14 converts the control instruction to an infrared control signal. The converted infrared control signal can be used to control at least one of the household electrical appliance, e.g., from appliance 1 to appliance N. After performing the remote control for the household electrical appliance, the Wi-Fi module 13 uploads a sound pulse signal corresponding to a prompt tone to the cloud server 4 through the Wi-Fi router 2 and the Internet. The smart terminal 3 can determine that one of the household electrical appliances is turned on through accessing the cloud server 4.

When one of the household electrical appliances 1 to N is turned on remotely, a prompt tone is available. The sound pulse detection module 15 detects the prompt tone and converts the prompt tone to a sound pulse signal. The sound pulse detection module 15 sends the sound pulse signal to the Wi-Fi module 13. Then, the Wi-Fi module 13 sends the sound pulse signal back to the smart terminal 3 through different settings of the control system and different connecting ways. The smart terminal 3 reads out whether the sound pulse signal is available, such that the user can confirm whether one of the household electrical appliances is turned on through the smart terminal 3.

In one embodiment, a communication interface between the sound pulse detection module 15 and the Wi-Fi module 13 of the LED lighting device 1 is General Purpose Input and Output (GPIO). A communication interface between the Wi-Fi module 13 and the infrared remote control module 14 is one of Inter-Integrated Circuit (I2C), Universal Asynchronous Receiver Transmitter (UART), Serial Peripheral Interface (SPI) and Secure Digital Input and Output (SDIO).

The smart terminal 3 (also known as a terminal device) may refer to any appropriate user terminal with certain computing capabilities. In certain embodiments, the smart terminal 3 may be a mobile terminal device such as smartphone, a tablet computer, a personal computer, etc. The smart terminal 3 may be implemented on any appropriate computing platform. The smart terminal 3 may be used by a user to connect to the wireless network and make requests to the cloud server 4.

Moreover, any number of the LED lighting devices may be included in the smart home control system, and the specific number can be increased or decreased according to actual needs.

Further, the cloud server 4 may refer to one or more server computers configured to provide certain services. The cloud server 4 may include one or more processors to execute computer programs in parallel.

Figure 6:
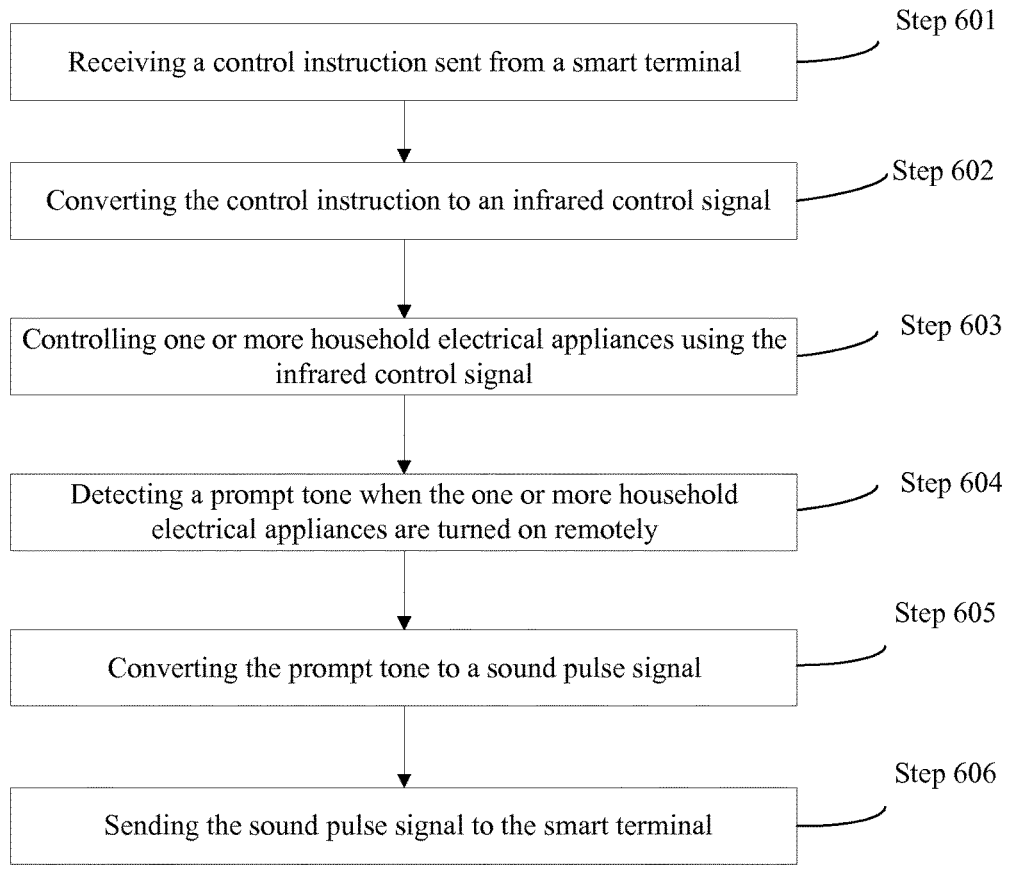
FIG. 6 illustrates a flow chart of an exemplary smart home control method consistent with the disclosed embodiments.

FIG. 6 illustrates a flow chart of an exemplary smart home control method consistent with the disclosed embodiments. The smart home control method is described from an LED lighting device side. As shown in FIG. 6, the process may include the following steps.

At the beginning, the LED lighting device receives a control instruction sent from a smart terminal (Step 601). The LED lighting device converts the control instruction to an infrared control signal (Step 602). Then, the LED lighting device controls at least one of a plurality of household electrical appliances using the infrared control signal (Step 603). When the at least one of the plurality of household electrical appliances is turned on remotely, a prompt tone is available. The LED lighting device detects the prompt tone (S604). Further, the LED lighting device converts the prompt tone to a sound pulse signal (S605). Then, the LED lighting device sends the sound pulse signal to the smart terminal (S606), such that the smart terminal can determine whether the one or more (or which one(s)) of the plurality of household electrical appliances are turned on remotely.

Further, The LED lighting device may send the sound pulse signal to the smart terminal through one of the following ways: the LED lighting device sends the sound pulse signal to the smart terminal directly; the LED lighting device sends the sound pulse signal to the smart terminal through a Wi-Fi router that provides a wireless network; the LED lighting device sends the sound pulse signal to the smart terminal through the Internet and the Wi-Fi router; and the LED lighting device sends the sound pulse signal to a cloud server through the Internet and the Wi-Fi router, such that the smart terminal accesses the cloud server to determine whether the one or more (or which one(s)) of the plurality of household electrical appliances is turned on remotely.

Figure 7:
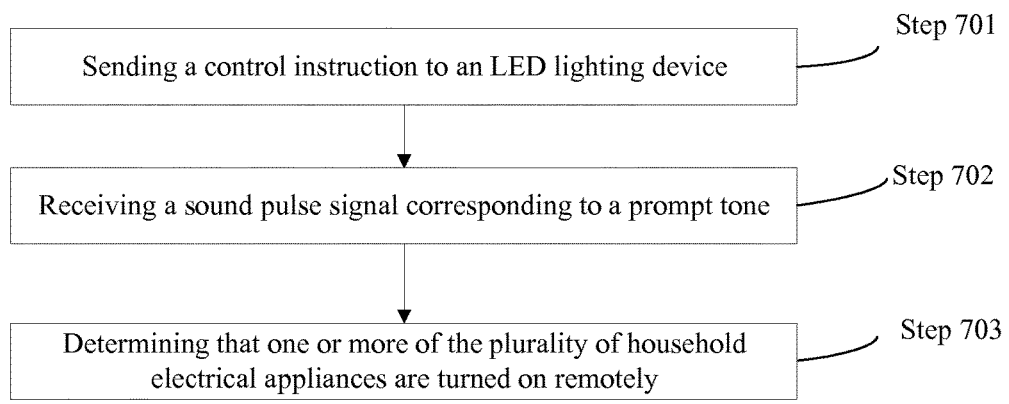
FIG. 7 illustrates a flow chart of another exemplary smart home control method consistent with the disclosed embodiments.

FIG. 7 illustrates a flow chart of another exemplary smart home control method consistent with the disclosed embodiments. The smart home control method is described from a smart terminal side. As shown in FIG. 7, the process may include the following steps.

At the beginning, the smart terminal sends a control instruction to an LED lighting device (Step 701). Specifically, the smart terminal may send the control instruction to the LED lighting device through one of the following ways: the smart terminal sends the control instruction directly to a Wi-Fi module of the LED lighting device; the smart terminal sends the control instruction to the LED lighting device through a Wi-Fi router that provides a wireless network; the smart terminal sends the control instruction to the LED lighting device through the Internet and the Wi-Fi router; or the smart terminal sends the control instruction to a cloud server through the Internet, such that the cloud server transmits the control instruction to the LED lighting device through the Internet and the Wi-Fi router.

When one or more of the plurality of household electrical appliances are turned on remotely, a prompt tone is available. The LED lighting device sends a sound pulse signal corresponding to the prompt tone to the smart terminal. At this time, the smart terminal receives the sound pulse signal corresponding to the prompt tone (Step 702). After receiving the sound pulse signal, the smart terminal determines whether the one or more (or which one(s)) of the plurality of household electrical appliances is turned on remotely (Step 703).

Figure 8:
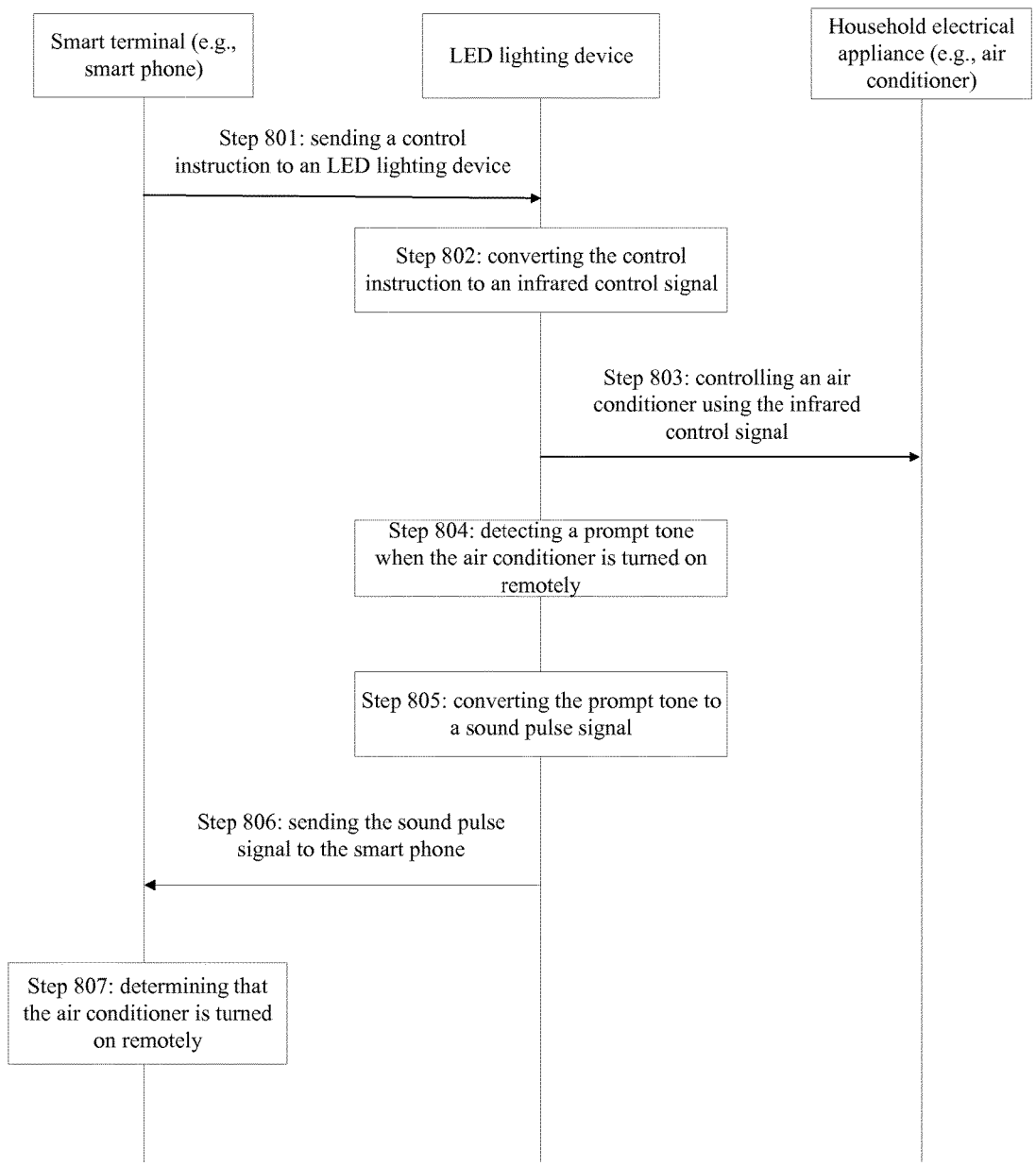
FIG. 8 illustrates a flow chart of another exemplary smart home control method consistent with the disclosed embodiments.

FIG. 8 illustrates a flow chart of another exemplary smart home control method consistent with the disclosed embodiments. As used herein, an exemplary smart terminal is a smart phone, and an air conditioner is an exemplary household electrical appliance that a user wants to turn on remotely. As shown in FIG. 8, the process may include the following steps.

At the beginning, a user sends a control instruction to an LED lighting device using his/her smart phone (Step 801). As described in the previous embodiments, the smart phone may send the control instruction to the LED lighting device through different ways, which are not repeated herein. After the LED lighting device receives the control instruction, the LED lighting device converts the control instruction to an infrared control signal (Step 802). The LED lighting device controls the air conditioner using the infrared control signal (Step 803). When the air conditioner is turned on remotely by the user, a prompt tone is available. The LED lighting device detects the prompt tone (Step 804). Further, the LED lighting device converts the prompt tone to a sound pulse signal (Step 805). The LED lighting device sends the sound pulse signal to the smart phone (Step 806). As described in the previous embodiments, the LED lighting device may send the sound pulse signal to the smart phone through different ways, which are not repeated herein. After the smart phone receives the sound pulse signal, the smart phone determines that the air conditioner is turned on remotely (Step 807).

In various embodiments, the power supply module 11, the LED light emitting module 12, the Wi-Fi module 13, the Infrared remote control module 14, and/or the sound pulse detection module 15 can be integrated into a lamp body of the LED lighting device to form a single device.

In various embodiments, controlling of the household electrical appliances that have an infrared remote control function may include, e.g., switching on/off the household electrical appliances, and/or changing parameters of the household electrical appliances (e.g., setting/altering a temperature for refrigerator or air conditioner, setting/altering a time for starting a dishwasher, etc.).

In some embodiments, different home appliances (or household electrical appliances) may have different tones when they are powered on or powered off. The LED lighting device may convert one prompt tone to one specific sound pulse signal. The LED lighting device may then send the sound pulse signal to the smart terminal. Because different pulse signals correspond to different tones, which in turn correspond to different home appliances being turned on or off, the smart phone may determine and display which home appliance is turned on or turned off based on the received signals.

In some embodiments, home appliances may set different tones for other control functions, such as altering temperature, humidity, etc. The LED lighting device may convert one prompt tone to one specific sound pulse signal. The LED lighting device may then send the sound pulse signal to the smart phone. Because different pulse signals correspond to different tones, which in turn correspond to different control functions of various home appliances (e.g., temperature adjustment of a refrigerator, fan adjustment for an air conditioning unit, etc.), the smart phone may determine and display which home appliance control parameter (e.g., temperature of the refrigerator or fan speed of the air conditioning unit) is changed based on the received signals.

The household electrical appliances can be placed anywhere as desired, e.g., at a residential house, an office, or any suitable indoor/outdoor places. For example, a household electrical appliance(s) can be placed in a hallway, a room, or any suitable places in a building. The household electrical appliance(s) can be controlled individually or as a group, in response to the control instruction sent from the smart terminal. In some cases, the smart terminal can be a gateway controller.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Comparing with the existing technology, a Wi-Fi module and an infrared remote control module are integrated in an LED lighting device. The LED lighting device converts a control instruction sent from a smart terminal to an infrared control signal. The infrared control signal is used to control a plurality of household electrical appliances (e.g., an air conditioner). Therefore, the household electrical appliances can be remotely controlled by the smart terminal (e.g., a smart phone, a tablet, and/or a personal computer). In addition, a sound pulse detection module is set in the LED lighting device. The sound pulse detection module can monitor in real-time a prompt tone when one or more of the plurality of household electrical appliances are turned on. Therefore, the smart terminal can determine that one or more of the plurality of household electrical appliances are turned on.

REFERENCE SIGN LIST

Lighting emitting diode (LED) lighting device 1
Wireless Fidelity (Wi-Fi) router 2
Smart terminal 3
Cloud server 4
Power supply module 11
LED light emitting module 12
Wi-Fi module 13
Infrared remote control module 14
Sound pulse detection module 15
Household electrical appliance 1
Household electrical appliance 2
Household electrical appliance N

What is claimed is:

1. A smart home control system, comprising:
a light emitting diode (LED) lighting device including: a light emitting module configured to emit light, a Wireless Fidelity (Wi-Fi) module, an infrared remote control module, and a sound pulse detection module, the infrared remote control module being electrically coupled to the Wi-Fi module, and the sound pulse detection module being electrically coupled to the Wi-Fi module; and
a terminal device configured to send a control instruction to the LED lighting device and to receive at least one sound pulse signal from the LED lighting device, wherein:
the Wi-Fi module is configured to receive the control instruction sent from the terminal device, and to directly transmit the control instruction to the infrared remote control module;
the infrared remote control module is configured to convert the control instruction to an infrared control signal used to control one or more of a plurality of household electrical appliances that have an infrared remote control function; and
the sound pulse detection module is configured to:
detect a prompt tone when the one or more of the plurality of household electrical appliances are turned on remotely;
convert the prompt tone to a sound pulse signal; and
send the sound pulse signal to the terminal device through the Wi-Fi module, such that the terminal device determines whether the one or more of the plurality of household electrical appliances are turned on.

2. The system according to claim 1, further including:
a Wi-Fi router configured to provide a wireless network for the smart home control system, wherein:
the LED lighting device is connected to the wireless network provided by the Wi-Fi router through the Wi-Fi module;
the terminal device sends the control instruction to the Wi-Fi module of the LED lighting device through the Wi-Fi router; and
the Wi-Fi module of the LED lighting device sends the sound pulse signal corresponding to the prompt tone to the terminal device through the Wi-Fi router.

3. The system according to claim 2, wherein:
the LED lighting device is wirelessly connected to the Internet through the Wi-Fi module and the Wi-Fi router;
the terminal device sends the control instruction to the Wi-Fi router through the Internet;
the Wi-Fi router transmits the control instruction to the Wi-Fi module of the LED lighting device; and
the Wi-Fi module of the LED lighting device sends the sound pulse signal corresponding to the prompt tone to the terminal device through the Wi-Fi router and the Internet.

4. The system according to claim 2, further including:
a cloud server configured to receive the control instruction from the terminal device through the Internet, and to transmit the control instruction to the Wi-Fi module of the LED lighting device through the Wi-Fi router and the Internet, wherein:
the LED lighting device is connected to the Internet through wirelessly connecting the Wi-Fi module and the Wi-Fi router;
the Wi-Fi module of the LED lighting device sends the sound pulse signal corresponding to the prompt tone to the cloud server through the Wi-Fi router and the Internet; and
the device terminal determines whether the one or more of the plurality of household electrical appliances are turned on through accessing the cloud server.

5. The system according to claim 1, wherein:
the Wi-Fi module has a routing function and an additional Wi-Fi router is not used;
the terminal device is wirelessly connected to the LED lighting device through the Wi-Fi module; and
the terminal device sends directly the control instruction to the Wi-Fi module of the LED lighting device.

6. The system according to claim 1, wherein:
a communication interface between the sound pulse detection module and the Wi-Fi module of the LED lighting device is General Purpose Input and Output (GPIO).

7. The system according to claim 1, wherein:
a communication interface between the Wi-Fi module and the infrared remote control module is one of Inter-Integrated Circuit (I2C), Universal Asynchronous Receiver Transmitter (UART), Serial Peripheral Interface (SPI) and Secure Digital Input and Output (SDIO).

8. The system according to claim 1, wherein:
the terminal device is one of a smartphone, a tablet computer, and a personal computer.

9. A smart home control method, comprising:
receiving, by an LED lighting device including a light emitting module to emit light, a control instruction sent from a terminal device;
converting, by the LED lighting device, the control instruction directly to an infrared control signal;
controlling, by the LED lighting device, one or more of a plurality of household electrical appliances using the infrared control signal;
detecting, by the LED lighting device, a prompt tone when the one or more of the plurality of household electrical appliances are turned on remotely;
converting, by the LED lighting device, the prompt tone to a sound pulse signal;
sending, by the LED lighting device, the sound pulse signal to the terminal device, and
determining, by the terminal device, whether the one or more of the plurality of household electrical appliances are turned on remotely based on the sound pulse signal.

10. The method according to claim 9, further including:
sending, by the terminal device, the control instruction to the LED lighting device; and
receiving, by the terminal device, the sound pulse signal corresponding to the prompt tone.

11. The method according to claim 10, wherein sending the control instruction to the LED lighting device includes one of the following ways:
sending the control instruction directly to a Wi-Fi module of the LED lighting device;
sending the control instruction to the LED lighting device through a Wi-Fi router that provides a wireless network;
sending the control instruction to the LED lighting device through the Internet and a Wi-Fi router; and
sending the control instruction to a cloud server through the Internet, such that the cloud server transmits the control instruction to the LED lighting device through the Internet and a Wi-Fi router.

12. The method according to claim 9, wherein sending the sound pulse signal to the terminal device includes one of the following ways:
sending directly the sound pulse signal to the terminal device by a Wi-Fi module of the LED lighting device;
sending the sound pulse signal to the terminal device through a Wi-Fi router;
sending the sound pulse signal to the terminal device through the Internet and a Wi-Fi router; and
sending the sound pulse signal to the cloud server through a Wi-Fi router and the Internet, such that the terminal device accesses the cloud server to determine whether the one or more of the plurality of household electrical appliances are turned on remotely.

13. The method according to claim 9, wherein:
a communication interface between a sound pulse detection module and a Wi-Fi module of the LED lighting device is General Purpose Input and Output (GPIO).

14. The method according to claim 9, wherein:
a communication interface between a Wi-Fi module and an infrared remote control module is one of Inter-Integrated Circuit (I2C), Universal Asynchronous Receiver Transmitter (UART), Serial Peripheral Interface (SPI) and Secure Digital Input and Output (SDIO).

15. An LED lighting device, comprising:
a power supply module configured to provide power for the LED lighting device;

a light emitting module configured to emit light;
a Wi-Fi module configured to receive a control instruction sent from a terminal device, and to directly send the received control instruction to an infrared remote control module;
the infrared remote control module configured to convert the control instruction to an infrared control signal used to control one or more of a plurality of household electrical appliances that have an infrared remote control function; and
a sound pulse detection module configured to:
  detect a prompt tone when the one or more of a plurality of household electrical appliances are turned on remotely;
  convert the prompt tone to a sound pulse signal; and
  send the sound pulse signal to the terminal device through the Wi-Fi module, such that the terminal device determines whether the one or more of the plurality of household electrical appliances are turned on.

16. The LED lighting device according to claim 15, wherein:
   a communication interface between the sound pulse detection module and the Wi-Fi module of the LED lighting device is General Purpose Input and Output (GPIO).

17. The LED lighting device according to claim 15, wherein:
   a communication interface between the Wi-Fi module and the infrared remote control module is one of Inter-Integrated Circuit (I2C), Universal Asynchronous Receiver Transmitter (UART), Serial Peripheral Interface (SPI) and Secure Digital Input and Output (SDIO).

18. The LED lighting device according to claim 15, wherein:
   the sound pulse detection module is installed at an outer surface of the LED lighting device.

* * * * *